(12) United States Patent
Coyle (10) Patent No.: US 11,739,725 B2
(45) Date of Patent: Aug. 29, 2023

(54) WATERWHEEL

(71) Applicant: Gerald Coyle, Fermanagh (GB)

(72) Inventor: Gerald Coyle, Fermanagh (GB)

( * ) Notice: Subject to any disclaimer, the term of this patent is extended or adjusted under 35 U.S.C. 154(b) by 381 days.

(21) Appl. No.: 16/980,477

(22) PCT Filed: Mar. 14, 2018

(86) PCT No.: PCT/GB2018/050655
§ 371 (c)(1),
(2) Date: Sep. 14, 2020

(87) PCT Pub. No.: WO2019/175523
PCT Pub. Date: Sep. 19, 2019

(65) Prior Publication Data
US 2021/0017950 A1 Jan. 21, 2021

(51) Int. Cl.
F03B 11/08 (2006.01)
F03B 7/00 (2006.01)
F03B 17/06 (2006.01)

(52) U.S. Cl.
CPC ............... *F03B 7/00* (2013.01); *F03B 11/08* (2013.01); *F03B 17/065* (2013.01)

(58) Field of Classification Search
None
See application file for complete search history.

(56) References Cited

U.S. PATENT DOCUMENTS

| 1,671,005 A | 5/1928 | Barnes |
| 4,270,056 A | 5/1981 | Wright |
| 4,301,377 A * | 11/1981 | Rydz ............... F03B 17/063 416/85 |
| 8,152,441 B2 | 4/2012 | Hofmann |
| 2002/0195823 A1 | 12/2002 | Aguirre |
| 2009/0175723 A1 * | 7/2009 | Broome ............. F03B 7/003 416/31 |

FOREIGN PATENT DOCUMENTS

| AU | 2018232942 A1 * | 10/2018 | ............ E02B 9/08 |
| CA | 2242560 C | 6/2000 | |
| CA | 2854072 A1 * | 5/2013 | ............ B63B 35/44 |
| CN | 101608594 A | 12/2009 | |

(Continued)

OTHER PUBLICATIONS

U.S. Pat. No. 141,074 to Percy, issued on Jul. 22, 1873.
U.S. Pat. No. 857,773 to Tibbitts, et al., issued on Jun. 25, 1907.

*Primary Examiner* — Michael Lebentritt
(74) *Attorney, Agent, or Firm* — Dan Brown Law Office; Daniel R. Brown; David Warrilow (57) ABSTRACT

A waterwheel assembly for a river or similar body of flowing water includes a waterwheel mounted on a support structure, and one or more buoyant members, wherein waterwheel can move up and down, and the buyout members support part of the weight of the waterwheel so that the waterwheel is able to rise and fall with any change to the river level, and the support structure is secured on land by the river or body of water by means of one or more cantilevered beams. The waterwheel has an axle secured between two vertical posts by means of salable bearings that permit the waterwheel to move up and down.

6 Claims, 7 Drawing Sheets

(56) References Cited

FOREIGN PATENT DOCUMENTS

| | | | |
|---|---|---|---|
| CN | 102384006 A | | 3/2012 |
| CN | 103088797 A | * | 5/2013 |
| CZ | 2008-617 A3 | | 4/2010 |
| DE | 20019079 U1 | | 2/2001 |
| DE | 102005033383 A1 | | 1/2007 |
| DE | 202010003601 U1 | | 2/2010 |
| DE | 202010010649 U1 | | 10/2010 |
| DE | 102010011324 A1 | | 9/2011 |
| GB | 2460725 A | | 12/2009 |
| JP | S59221472 A | | 12/1984 |
| JP | 2002213340 A | | 7/2002 |
| JP | 2013245618 A | | 12/2013 |
| KR | 101032455 B1 | | 5/2011 |
| KR | 101050083 B1 | | 7/2011 |
| KR | 20120081283 A | | 7/2012 |
| KR | 20120109933 A | | 10/2012 |
| KR | 101232332 B1 | | 2/2013 |
| TW | 445079 U | * | 1/2013 ............... F03B 13/10 |
| WO | WO-2007129185 A2 | * | 11/2007 ............ F03B 17/063 |
| WO | WO-2012000025 A1 | * | 1/2012 ............... E02B 9/08 |

\* cited by examiner

WATERWHEEL

RELATED APPLICATIONS

WIPO international PCT patent application serial number PCT/GB2018/050655, filed on 14 Mar. 2018.

BACKGROUND OF THE INVENTION

Field of the Invention

The present specification relates to a waterwheel, particularly though not exclusively for use with a river.

DESCRIPTION OF RELATED ART

Waterwheels have long been used to convert some of the kinetic energy of flowing water into mechanical power via a turning axle. Originally, this rotation of the axle would often be used to directly drive adjacent machinery, but more recently waterwheels have also been used to generate electricity, and once installed, they do not produce any pollutants.

However, rivers and riverbanks are themselves sensitive habitats, and it is important that the installation has minimal impact on the immediate environment, as well as providing a waterwheel that efficiently utilizes the flowing water of the river. Thus, it can be appreciated that there is a need in the art to address the problems in the prior art.

SUMMARY OF THE INVENTION

The present invention seeks to provide a folding structure that addresses the problems in the prior art.

According to the present invention, there is provided a waterwheel assembly according to the independent claims. In particular, the present disclosure teaches a waterwheel assembly for a river or similar body of flowing water that includes a waterwheel mounted on a support structure with one or more buoyant members, such that the waterwheel can move up and down, and the buoyant members support part of the weight of the waterwheel so that the waterwheel is able to rise and fall with any change to the river level. In addition, the support structure is secured on land by the river or body of water by means of one or more cantilevered beams.

The present disclosure further teaches a waterwheel assembly for a river or similar body of flowing water, including two vertical posts and a waterwheel, that has an axle secured between the two vertical posts, with one or more buoyant members. And, the axle is supported between the two vertical posts by means of slidable bearings that permit the waterwheel to move up and down, and the buoyant members support part of the weight of the waterwheel so that the waterwheel is able to rise and fall with any change to the river level.

The present disclosure further teaches a waterwheel for a river or similar body of flowing water, including a support structure, two vertical posts, and a waterwheel, that has an axle secured between the vertical posts. And further including, one or more buoyant members, wherein the axle is supported between the two vertical posts by means of slidable bearings that permit the waterwheel to move up and down, and the buoyant members support part of the weight of the waterwheel so that the waterwheel is able to rise and fall with any change to the river level. In addition, the one or more buoyant members have an elongated form oriented perpendicular to the axle and substantially horizontal, each of the one or more buoyant members being attached to the axle by diagonal struts, the attachment allowing the axle to turn relative to the one or more buoyant members.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

Figure 1:
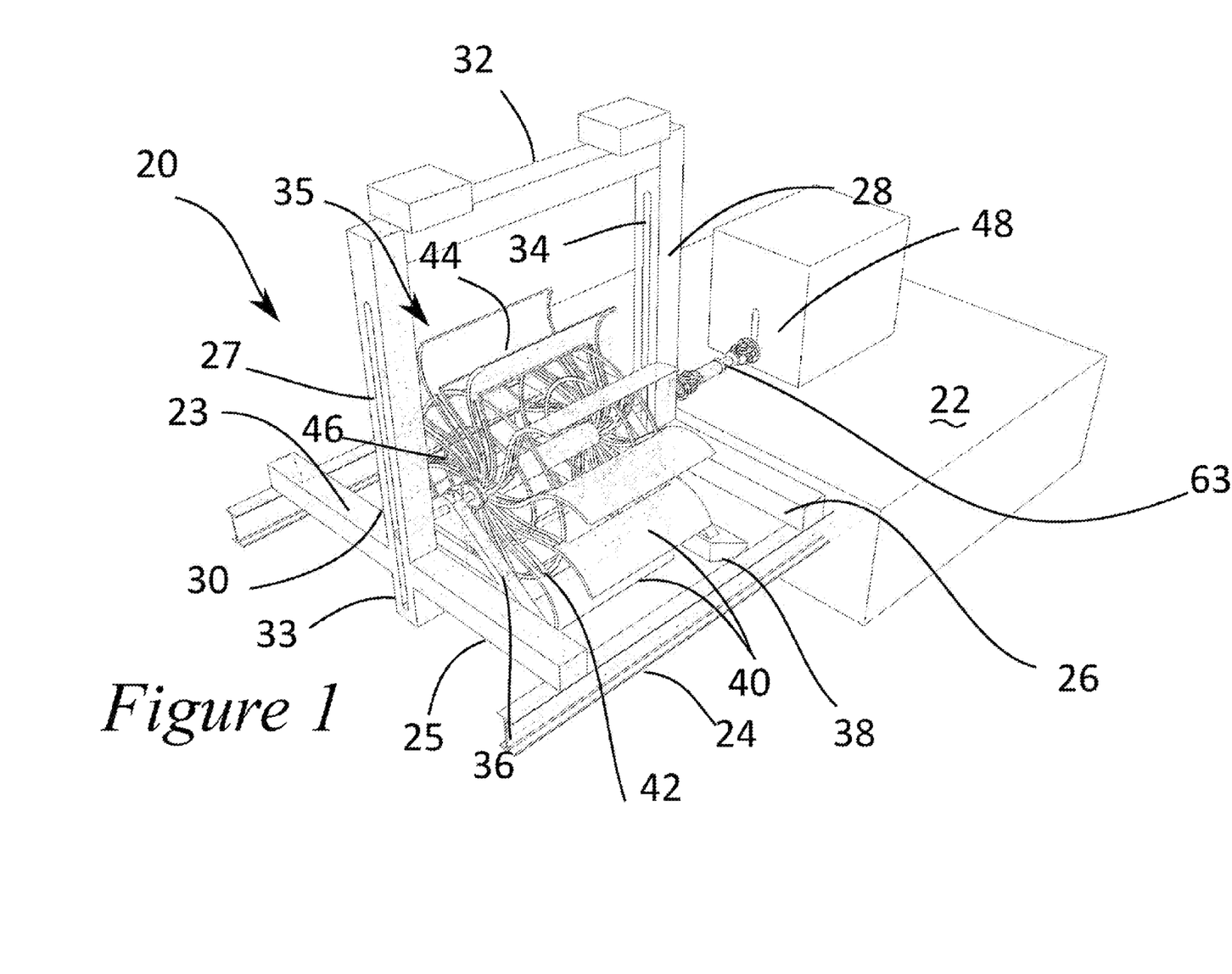
FIG. 1 is a perspective view of the waterwheel.
Figure 2:
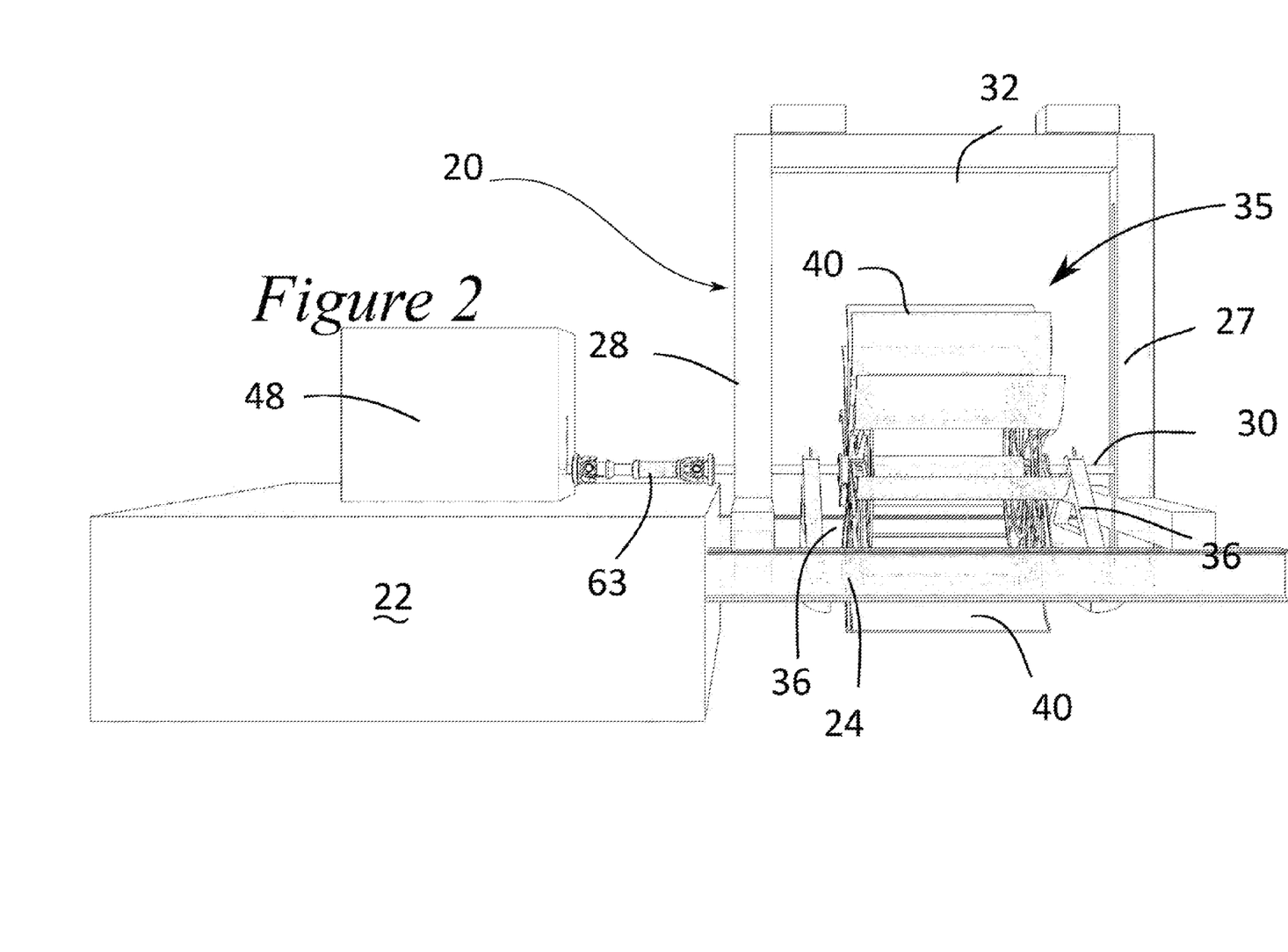
FIG. 2 is a side elevation of the waterwheel.
Figure 3:
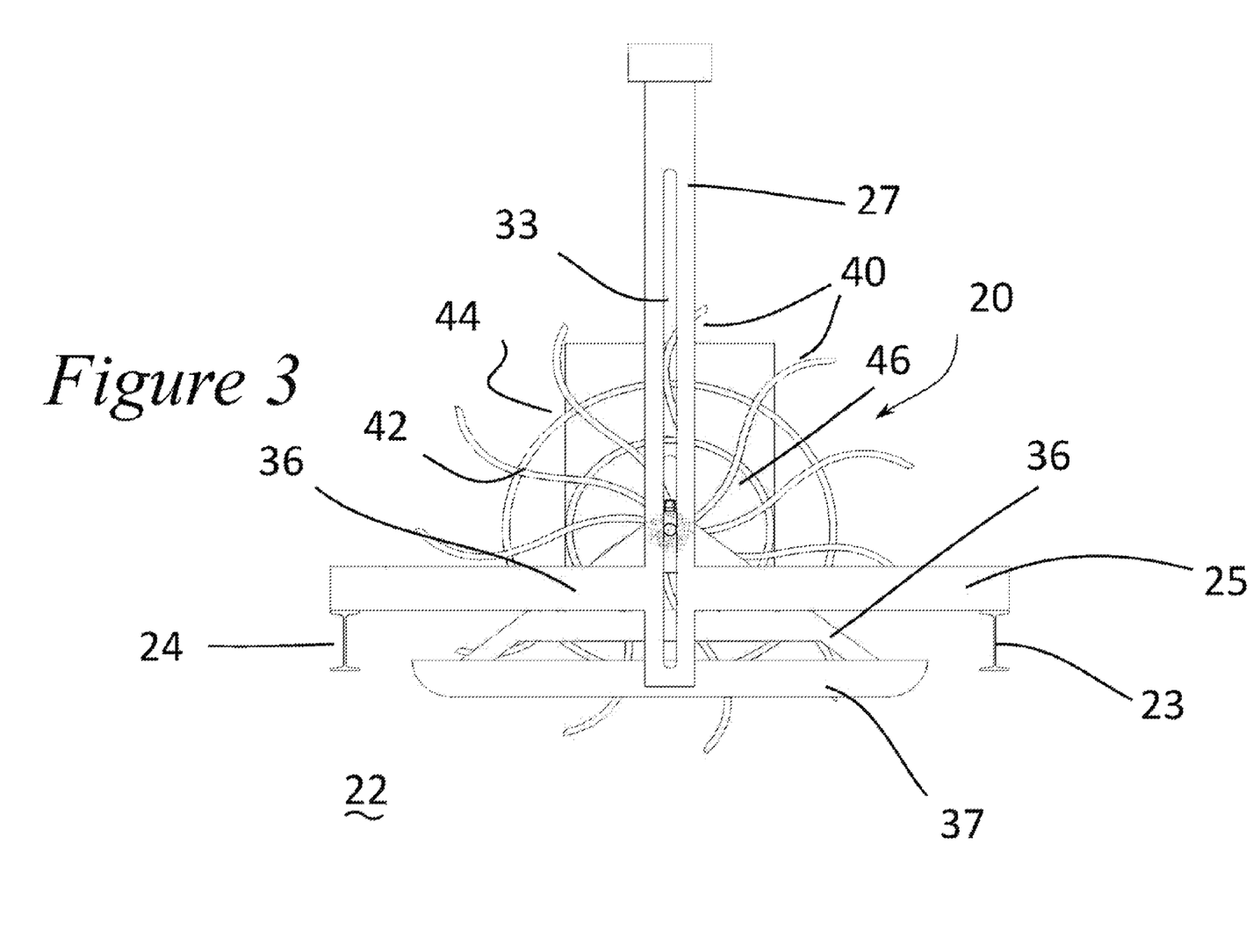
FIG. 3 is a front elevation of the waterwheel.

Referring to FIG. 1, the waterwheel assembly 20 is supported by a concrete base 22 which is disposed on the top of a river bank (not shown). Two parallel spaced support beams 23, 24 extend from the concrete base 22 transversely to the river bank. The support beams 23, 24 may be formed from lengths of standard RSJ (rolled steel joist) I-beam. Two spaced parallel stringer beams 25, 26 extend perpendicularly between the support beams 23, 24. Two vertical posts 27, 28 extend upwards from the two stringer beams 25, 26, and these vertical posts 27, 28 are connected at their upper ends by a brace 32.

The waterwheel 35 is supported on an axle 30 that extends between the vertical posts 27, 28, supported by journal bearings (not shown) that allow the axle to turn. Two sets of radial spokes 42 are formed on the axle 30, each set of spokes 42 being reinforced by a circular rim 44. Where the ends of each spoke meets the rim, paddles 40 are set extending between the two rims. However, it will be realised that other forms of waterwheel could be used.

Two floats 37, 38 depend from the axle 30, each of the floats 37, 38 being secured by two arms 36 which are arranged triangularly, each arm secured to one end of the elongate form of each floats 37, 38, the two arms 36 meeting where they are secured to the axle, the axle being mounted in a bearing where it passes through the arms 38 so that the axle can freely rotate relative to the arms.

Each of the vertical posts 27, 28 includes a vertical channel 33, 34, these channels 33, 34 running most of the length of the vertical posts 27, 28. The axle and its journal bearing (and hence the waterwheel 35) are free to move up and down.

The axle 30 extends through the vertical post 28 nearest the river bank, and is torsionally attached to a power transfer means which in leads to a gearbox and generator 48; the power transfer means 63 may being flexible or articulated to accommodate vertical movement of the axle 30, as shown in figure.

The waterwheel assembly 20 and concrete base 22 are located so that the flow of water of the river or waterway is perpendicular to the paddles 40 of the waterwheel 35. The weight of the waterwheel 35 is supported by an upward force from the floats 37, 38, which float partially submerged on the surface of the river. Since the axle 30 of the waterwheel 35 is free to move up and down the channels 33, 34 of the vertical posts 27, 28, the waterwheel rises and falls with any variation in height of the river. The waterwheel 35 and floats 37, 38 are arranged so that paddles 40 of the waterwheel 35 are optimally positioned to be efficiently extract kinetic energy from the flowing water.

By deposing this self-regulating waterwheel arrangement on in a cantilevered manner from the bank, the waterwheel can be quickly and efficiently installed in position, with no impact on the riverbed, and little impact on the river bank. Damning or modification of the river to create a race are entirely avoided.

Figure 4:
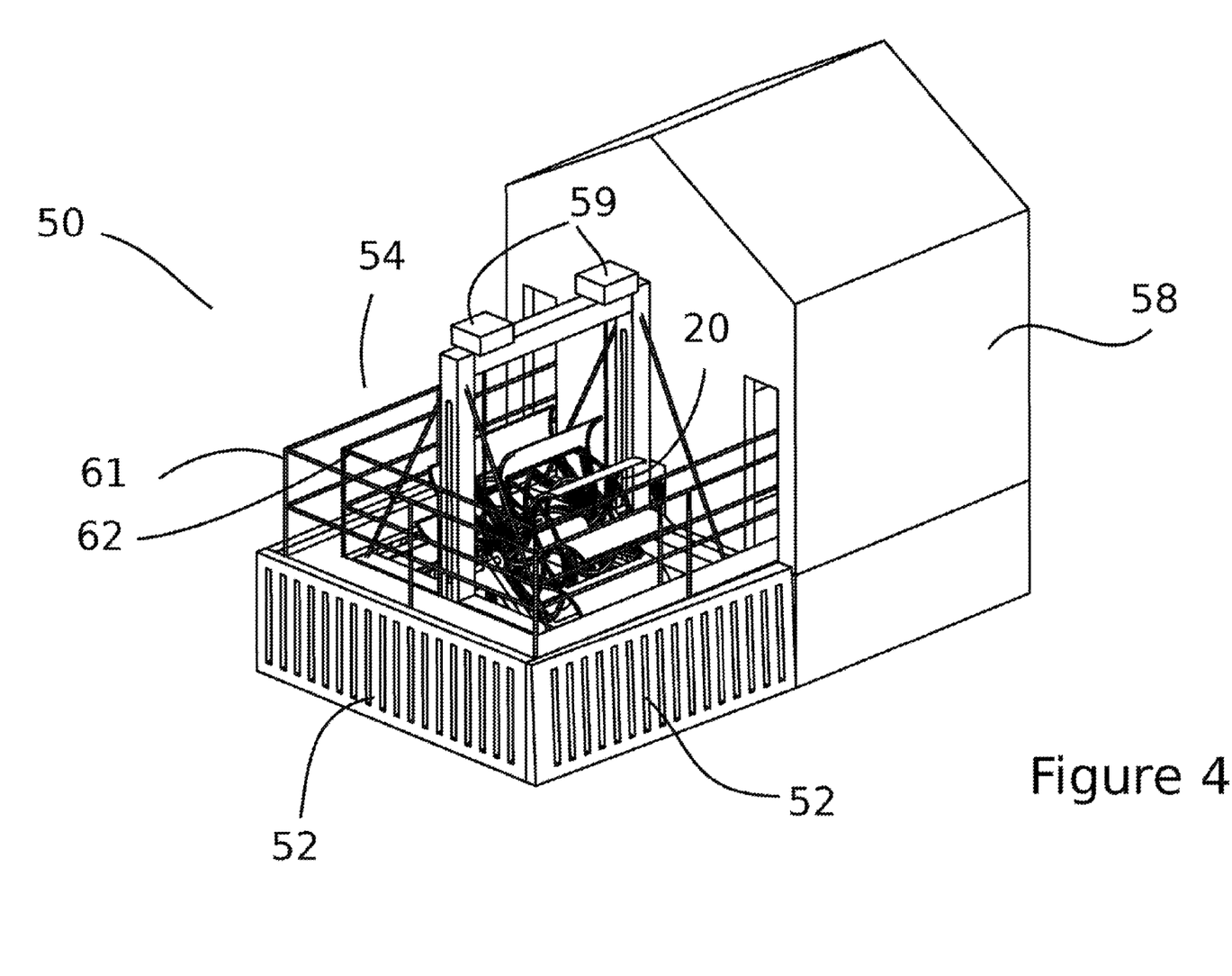
FIG. 4 is a perspective view of the waterwheel with a surrounding protective structure.
Figure 5:
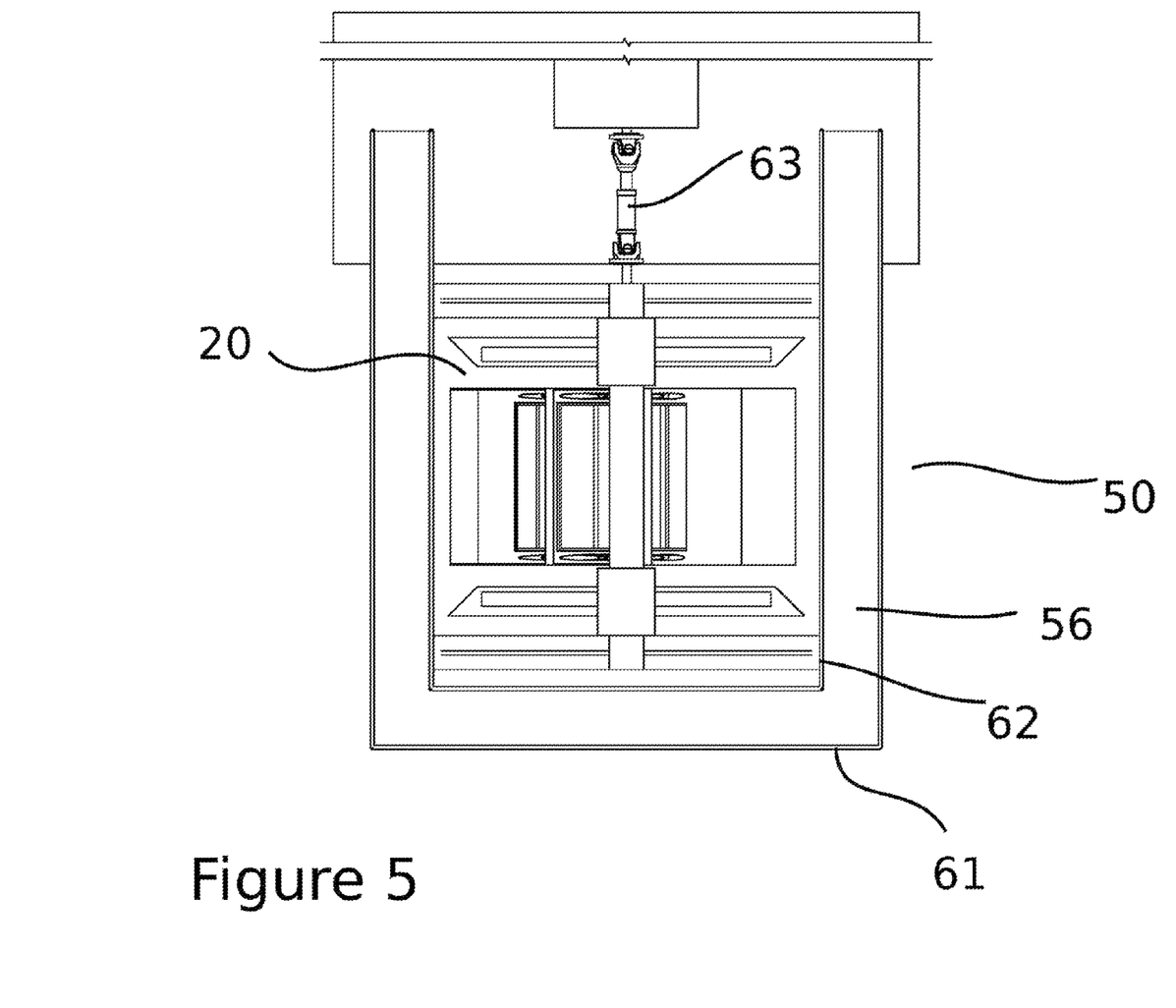
FIG. 5 is a plan view of the waterwheel with a part of the surrounding protective structure.

Referring to FIG. 4, the waterwheel assembly 20 is surrounded by a protective structure 50 comprising slats 52 and cage 54, which also incorporates a walkway 56. The gearbox and generator 48 is enclosed within a gearing house 58. The protective structure 50 projects from the gearing house 58, and, a referring to FIG. 5, in plan view, the protective structure 50 forms three sides of a rectangle, so that the gearing house 58 and protective structure 50 completely encompass the waterwheel assembly 20.

Figure 7:
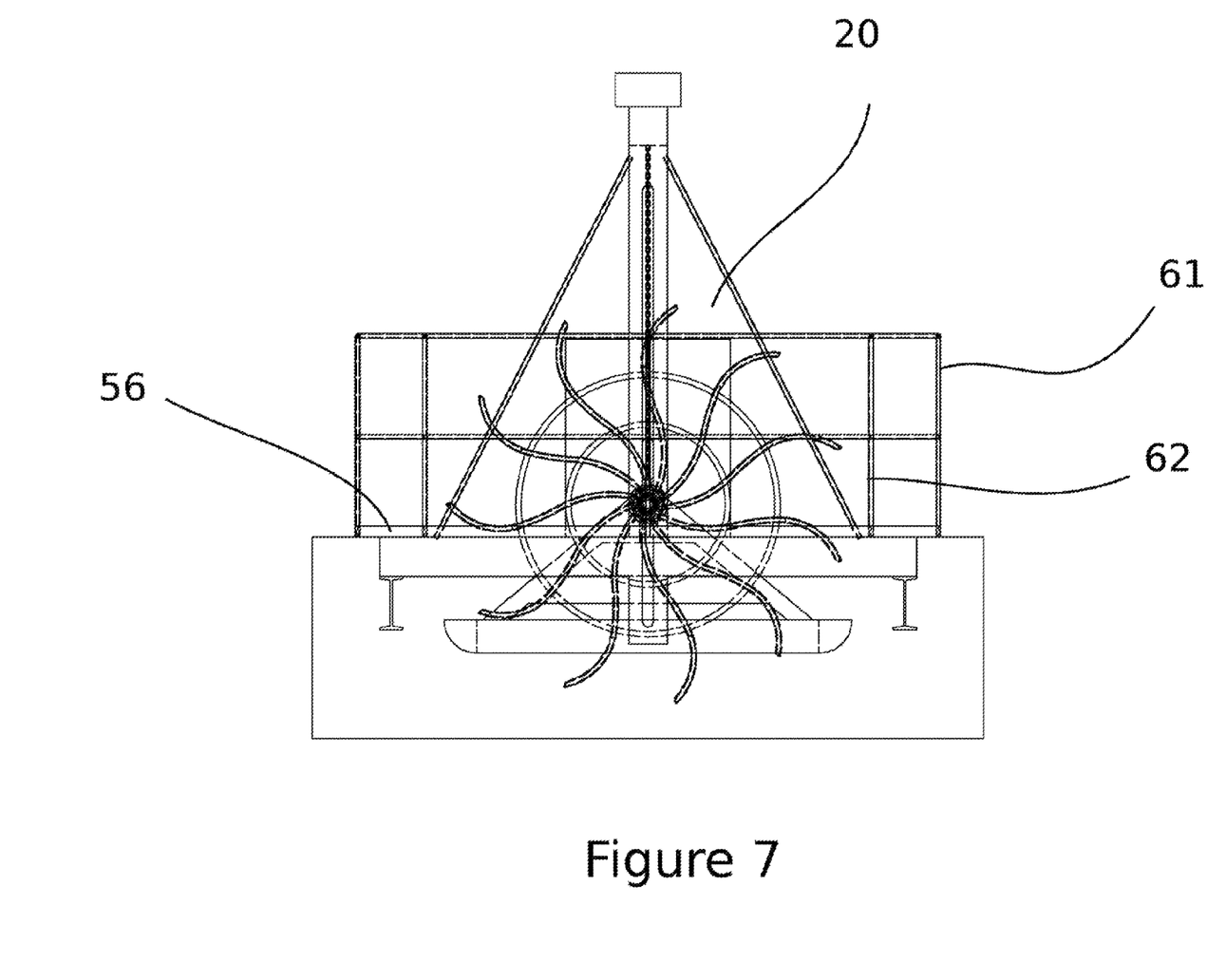
FIG. 7 is a side elevation of the waterwheel with a part of the surrounding protective structure.

The walkway 56 is situated well above the normal water level of the river. Referring both to FIG. 4 and FIG. 7, the slats 52 extend vertically downwards from the edge of the walkway 56, to a depth beneath the lowest extent of the waterwheel 35. The slats 52 comprise a screen having vertical slots that allows water to pass through relatively unimpeded, but prevents branches and other debris that may be washed down the river and may otherwise becoming entangled with or damage the waterwheel 35. The cage 54 extends upwards from the edge of the walkway, the inner cage 62 projecting upwards from the inside edge of the walkway 56 and the outer cage 61 projecting upwards from the outside edge of the walkway 56. The outer cage 61 prevents unauthorised persons accessing the waterwheel assembly 20 from outside of the structure. The walkway 56 allows access via the gearing house 58 for authorised persons to walk around and inspect the waterwheel assembly 20. If necessary, the waterwheel 35 can be raised on lifting gear 59 in order to carry out maintenance.

If required, the outer cage 61 could be extended higher, and even form a cage structure above the waterwheel assembly 20 to completely prevent unauthorised persons from climbing into the waterwheel assembly 20.

Figure 6:
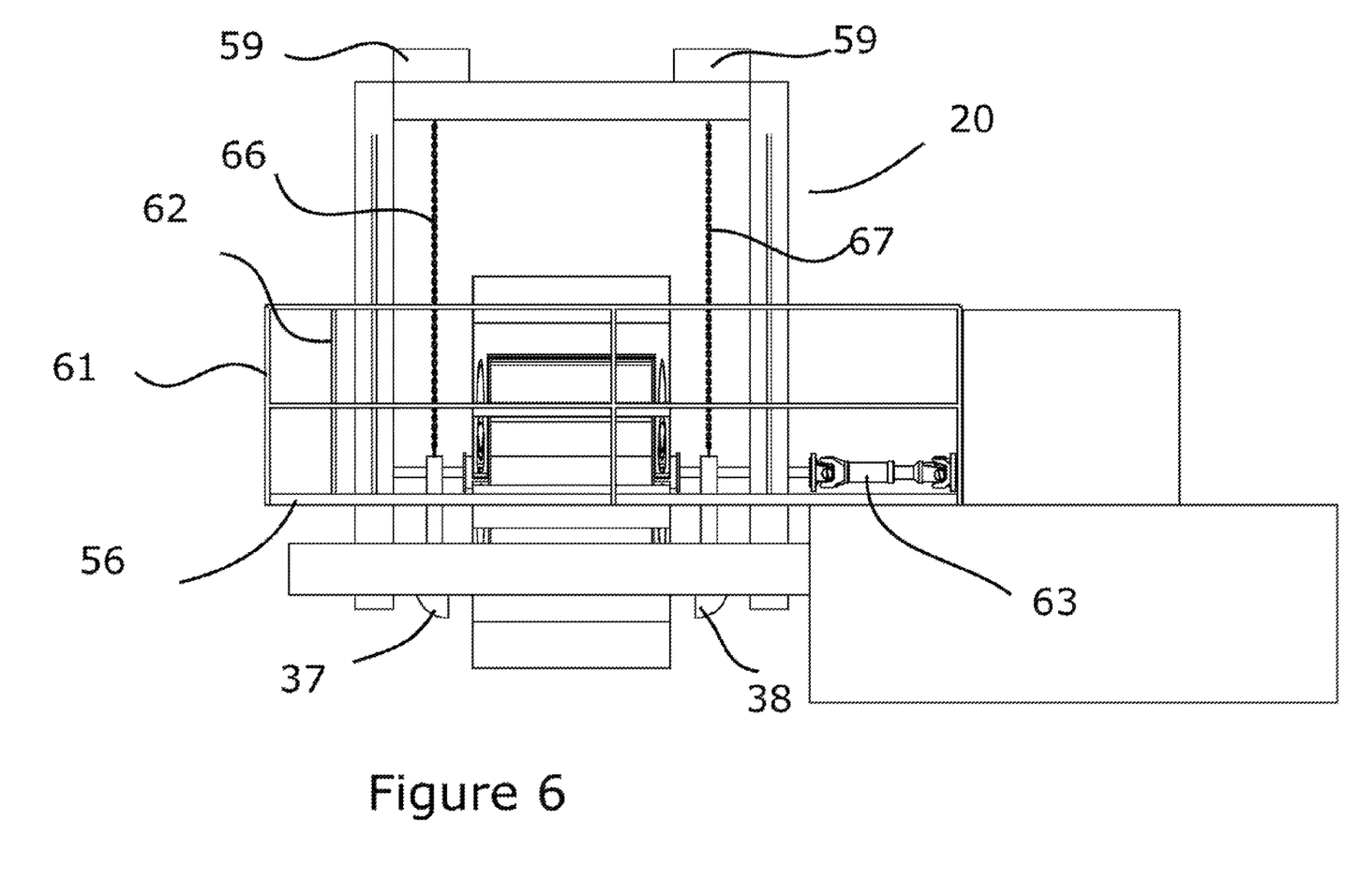
FIG. 6 is a front elevation of the waterwheel with a part of the surrounding protective structure.

FIG. 6 shows a view of the waterwheel assembly 20 and cage 54, without the slats 52. The articulated power transfer means 63 can be seen clearly here.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A waterwheel assembly for a river or similar body of flowing water, comprising:
   a waterwheel mounted on a support structure about an axle;
   one or more buoyant members, and wherein
   said waterwheel can move up and down, and said buoyant members support part of the weight of said waterwheel so that said waterwheel is able to rise and fall with any change to the river level, and wherein
   said support structure is secured on land by the river or body of water by one or more cantilevered beams, and wherein
   said waterwheel assembly further includes a gearbox and a generator enclosed within a gearing housing placed on land by the river or body of water, and wherein
   said axle is torsionally attached to a power transfer member which leads to said gearbox and generator, and wherein
   said power transfer member is flexible or articulated to accommodate vertical movement of said axle.

2. A waterwheel assembly according to claim 1, and wherein:
   said waterwheel has an axle secured between two vertical posts by means of slidable bearings that permit said waterwheel to move up and down.

3. A waterwheel assembly according to claim 1, and wherein:
   said one or more buoyant members have an elongated form oriented perpendicular to said axle and substantially horizontal, each of said one or more buoyant members being attached to said axle by diagonal struts, said attachment allowing said axle to turn relative to said one or more buoyant members.

4. A waterwheel assembly according to claim 1, and further comprising:
   a cage structure substantially above the normal water level around said assembly to prevent unauthorized access.

5. A waterwheel assembly according to claim 1, and further comprising:
   a screen structure substantially below the normal water level around said assembly to prevent debris from contacting said waterwheel.

6. A waterwheel assembly according to claim 1, and further comprising:
   a lifting gear that can raise said waterwheel independently of said buoyant members.

\* \* \* \* \*